March 10, 1970 R. E. OBENHAUS 3,500,074
FAIL-SAFE CONTROLLER
Filed Aug. 15, 1966 2 Sheets-Sheet 1

Robert E. Obenhaus,
Inventor.
Koenig, Senniger, Powers and Leavitt,
Attorneys.

March 10, 1970

R. E. OBENHAUS 3,500,074

FAIL-SAFE CONTROLLER

Filed Aug. 15, 1966

United States Patent Office 3,500,074
Patented Mar. 10, 1970

3,500,074
FAIL-SAFE CONTROLLER
Robert E. Obenhaus, South Easton, Mass., assignor to Texas Instruments Incorporated, Dallas, Tex., a corporation of Delaware
Filed Aug. 15, 1966, Ser. No. 572,318
Int. Cl. H03k 1/00
U.S. Cl. 307—310    9 Claims

ABSTRACT OF THE DISCLOSURE

A fail-safe controller selectively energizes a load in response to variations in the resistance of a sensor within a given range and deenergizes the load when the sensor resistance goes outside of the given range.

---

Various sensors are known which respond to changes in a given parameter by varying in resistance. For example, thermistors provide a resistance which varies with temperature. Accordingly, thermistors are frequently employed in thermal-control and protection apparatus such as overload protectors for electric motors, the sensing thermistor or thermistors being buried in the motor windings. The thermistor resistance varies over a given range with normal variations in the motor winding temperature and the protector deenergizes the motor if the thermistor temperature exceeds a preselected level. The possibility exists, however, that there may be failure of the thermistor in the associated circuitry which would cause the resistance in the thermistor circuit to pass outside of its normal range in the direction or sense which would ordinarily cause the motor to remain energized. It is highly desirable that the controller includes some provision for deenergizing the load in such a situation so that the motor or other load is not allowed to be operated without thermal protection.

Among the several objects of the present invention may be noted the provision of a fail-safe controller which selectively energizes a load in response to variations in the resistance of a sensor within a given range and which deenergizes the load when the sensor resistance departs from the given range; the provision of such a fail-safe controller which will deenergize the load upon variations in the sensor resistance beyond the given range in either sense; the provision of such a controller employing semiconductor current switching means for controlling the flow of power to the load; the provision of such a controller which is highly reliable; and the provision of such a controller which is relatively simple and inexpensive. Other objects and features will be in part apparent and in part pointed out hereinafter.

Briefly, a fail-safe controller according to the present invention will selectively energize a load in response to variations in the resistance of a sensor over a given, normal range. A semiconductor current switching means is provided for switching the flow of power to the load. The current switching means has a control electrode to which triggering current is applied to cause energization of the load. The sensor is connected in a voltage divider circuit for generating a control voltage which varies as a function of the resistance of the sensor, there being a normal range of control voltages corresponding to the normal control range variations in the resistance of the sensor. Triggering current is applied to the control electrode of the semiconductor current switching means through circuitry including a transistor which is connected to the voltage divider and which is responsive to the control voltage provided thereby. The transistor is operative to discontinue the flow of current to the control electrode when the control voltage is of a first polarity with respect to a preselected threshold within the normal range of control voltages. Further means are provided which are responsive to control voltages of a polarity opposite to the first polarity with respect to the threshold and which are outside of the normal range of control voltages for discontinuing the flow of triggering current to the control electrode independently of the operation of the transistor. Accordingly, circuit failures in the controller or sensor which produce control voltages outside of the normal range of control voltages cause the load to be deenergized.

The invention accordingly comprises the constructions hereinafter described, the scope of the invention being indicated in the following claims.

In the accompanying drawings, in which several of various possible embodiments of the invention are illustrated, FIG. 1 is a schematic circuit diagram of a fail-safe controller of this invention which employs an NTC thermistor sensor;

Corresponding reference characters indicate corresponding parts throughout the several views of the drawings.

Figure 1:
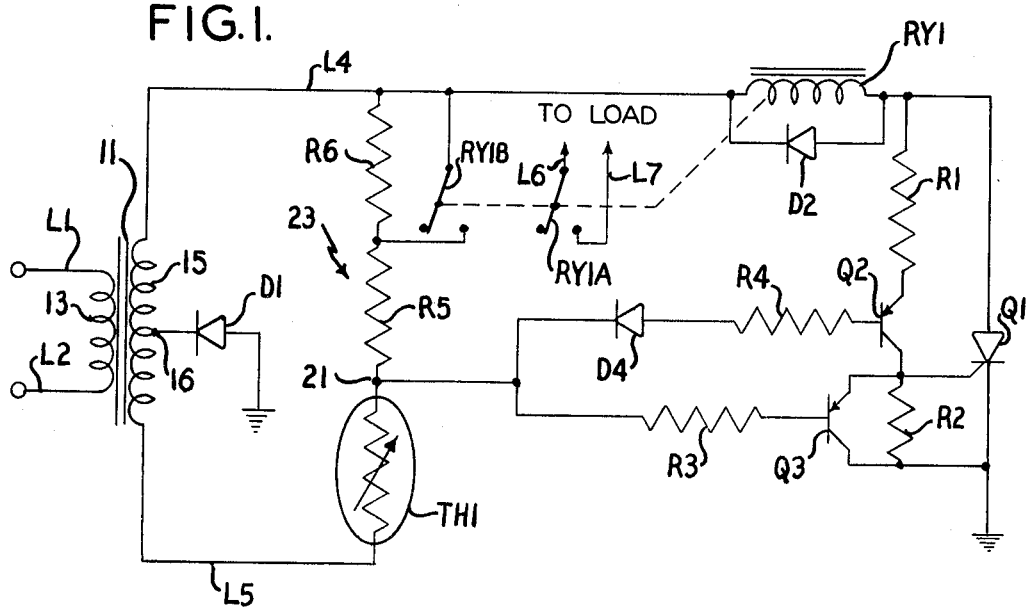

Referring now to FIG. 1, one embodiment of the present invention is illustrated as comprising a transformer 11 having a primary winding 13 to which are connected a pair of supply leads L1 and L2 for supplying power from a conventional A.C. source or supply mains. Transformer 11 is provided with a secondary winding 15, an intermediate tap of which is connected to ground through a diode D1. In the embodiment illustrated, the intermediate tap is a center tap 16 and secondary winding 15 provides balanced out-of-phase A.C. power, at a reduced voltage suitable for semiconductor circuitry, to a pair of leads L4 and L5.

A pair of leads L6 and L7 are provided for connection to an external load circuit (not shown). Leads L6 and L7 are connected to the normally open side of a set of relay contacts RY1A which are operated under the control of a relay coil RY1. Coil RY1 is connected between line L4 and ground by a circuit which includes the anode-cathode circuit of an SCR (silicon controlled rectifier) Q1. Triggering current is applied to the gate electrode of SCR Q1 from its anode terminal through a resistor R1 and the emitter-collector circuit of a PNP transistor

3

Q2 when the transistor is conducting. A resistor R2 shunts the gate-cathode circuit of SCR Q1 for shunting any leakage currents. Since the silicon controlled rectifier can conduct in one direction only, relay coil RY1 is shunted by a diode D2 which is oriented to permit inductively stored current to flow during the alternate half cycles thereby to prevent chattering of the relay.

The emitter-collector circuit of a PNP transistor Q3 is connected across the gate-cathode circuit of SCR Q1 in parallel with resistor R2 for selectively shunting current flowing through resistor R1 away from the gate of SCR Q1. The base terminal of transistor Q3 is connected, through a current limiting resistor R3, to a junction 21 in a voltage divider 23 which is connected across lines L4 and L5. Voltage divider 23 includes, in series connection, an NTC thermistor TH1, a reference level thermistor R5 and a response differential resistor R6. The normally open side of a set of relay contacts RY1B is connected across resistor R6 for selectively shunting it out of the voltage divider.

The base terminal of transistor Q2 is also connected to junction 21, through a current limiting resistor R4 and a diode D4. When the control voltage provided at junction 21 is within its normal range, transistor Q2 is forward-biased and conducting so that triggering current can flow through resistor R1 to the gate electrode of SCR Q1.

The anode-cathode circuit of SCR Q1 is connected in a circuit between one side of the center tapped secondary winding 15 and ground. Since the center lap 16 is connected to ground by diode D1, SCR Q1 and its associated control circuitry will thus be operative only on those half cycles of the A.C. supply voltage during which the line L4 is positive with respect to ground. Accordingly, in the following description of the operation of this circuit, the polarities ascribed to the various portions of the circuit should be understood to be those which exist during such half cycles.

By virtue of its connection to the gate terminal of SCR Q1, the emitter of transistor Q3 is maintained at a voltage which is substantially at ground potential. Accordingly, the polarity of the bias applied to the base-emitter circuit of transistor Q3 through resistor R3 will depend essentially upon the voltage at junction 21 with respect to ground potential. The magnitude and polarity of the voltage present at junction 21 will, in turn, depend upon the resistance of thermistor TH1 as compared with the combined resistance of the resistors R5 and R6 when the contacts shunting resistor R6 are open and as against the resistance of resistor R5 alone when those contacts are closed.

The operation of the circuit of FIG. 1 as the resistance of thermistor TH1 varies within its normal range is as follows. Since thermistor TH1 is of the NTC (negative temperature coefficient) type, it will exhibit a relatively high resistance when it is cool. Therefore, under such conditions, junction 21 will assume a positive voltage with respect to ground. A positive voltage at junction 21 reverse-biases transistor Q3 so that it does not conduct. Therefore, if transistor Q2 is conducting, triggering current can flow through resistor R1 to the gate electrode of SCR Q1 triggering it into conduction. Current passed by SCR Q1 energizes relay coil RY1 causing the contacts RY1A and RY1B to be operated to the positions opposite those shown in FIG. 1. If lines L6 and L7 are included in the power circuit of a load to be controlled, that load may thus be enregized.

On the other hand, when the temperature sensed by thermistor TH1 rises. It will exhibit a relatively low resistance and the voltage at junction 21 will become negative with respect to ground. A negative voltage at junction 21 forward-biases transistor Q3 so that it conducts and shunts current away from the gate electrode of SCR Q1 thereby preventing it from being triggered. When SCR Q1 does not conduct, the relay RY1 is deenergized and the contacts RY1A and RY1B assume the position shown in the drawings. A load circuit connected to leads L6 and L7 will thus be deenergized.

By selectively shunting resistor R6, the contacts RY1B introduce a differential into the response of this control circuit in known manner. Thus, while a given relatively high temperature at thermistor TH1 will cause the control circuit to deenergize the load circuit, the thermistor must be cooled to an appreciably lower temperature before the control circuit will reset and allow power to be restored to the load. Thus, so-called hunting of the control system is prevented.

Figure 2:
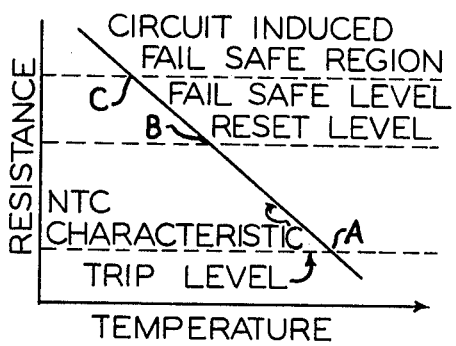
FIG. 2 is a graph representing the variations in resistance of the NTC thermistor with temperature and illustrating the response of the circuit of FIG. 1 to such variations.

This mode of operation is illustrated in FIG. 2 in which the resistance of NTC thermistor TH1 is plotted against temperature. When heating of the thermistor causes its resistance to drop below the trip level as indicated at A, the load is deenergized. Before power can be reapplied to the load, the thermistor must cool until the reset level is reached as indicated at B.

From the above description, it can be seen that the mode of operation of this control circuit is appropriate for motor protection purposes. That is, if power is applied to the motor through the leads L6 and L7 and the thermistor TH1 is embedded in the windings of the motor, the control circuit will deenergize the motor if it overheats beyond a predetermined temperature. The particular temperature at which tripping occurs may be adjusted by appropriately selecting the value of resistor R5 in relation to the normal resistance of thermistor TH1.

In normal operation the temperature to which thermistor TH1 is exposed will vary over a nominal range and the resistance of the thermistor and the voltage at junction 21 will vary over corresponding ranges. However, as noted previously, various failures may occur which will cause the apparent thermistor resistance, as seen by the control circuit, to vary beyond the normal range. If such a failure causes the apparent resistance of thermistor TH1 to go to a very low value, e.g., a short circuit, the normal mode of operation of the control circuit will cause the load to be deenergized as explained previously. The load will thus not be damaged.

If, however, the apparent resistance of thermistor TH1 should go to a value above that indicated at C in FIG. 2, as might be caused by a break in one of the leads to the thermistor or by an open circuit within the thermistor itself, the voltage at junction 21 would become positive and would tend to maintain the energization of the load in the normal mode of operation explained heretofore. Energization of the load under such abnormal conditions is prevented in the following manner. An exceptional high thermistor resistance causes the voltage at junction 21 to go substantially beyond its normal range in the positive sense. Such a positive voltage reduces the forward bias applied to transistor Q2 to a value insufficient to support the flow of SCR triggering current through the emitter-collector circuit of transistor Q2. Thus the flow of triggering current is discontinued independently of the operation of transistor Q3. When the flow of triggering current is thus discontinued, SCR Q1 ceases conduction, the relay coil RY1 is deenergized and the load is deenergized. It can thus be seen that a fail-safe mode of operation is obtained wherein the load will always be deenergized whenever the resistance of thermistor TH1 substantialy departs from its normal range of values.

Figure 3:
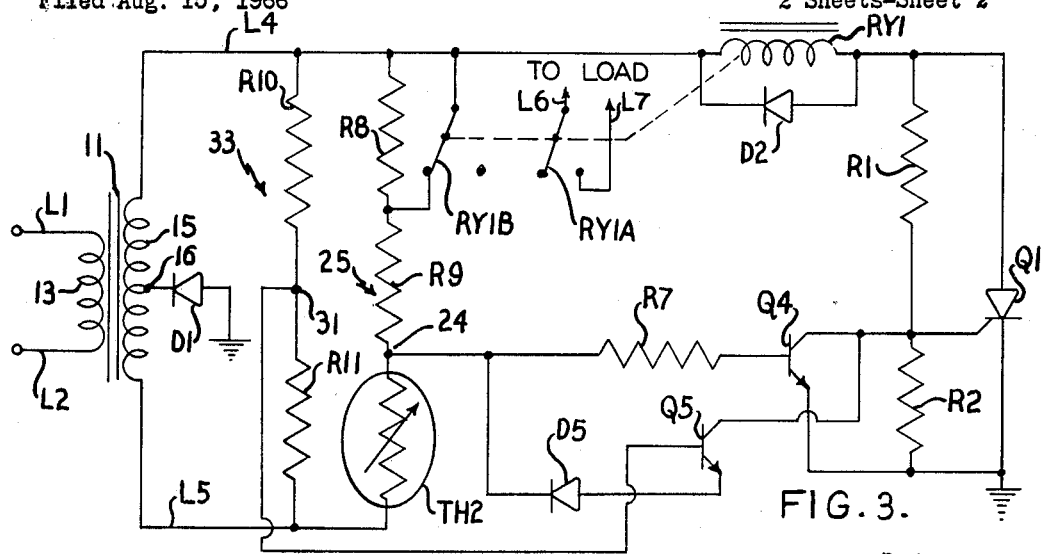
FIG. 3 is a schematic circuit diagram of a fail-safe controller employing a PTC thermistor.

In the FIG. 3 embodiment, which is adapted to employ a PTC thermistor TH2, the relay winding RY1 is again connected between one end of the center tap secondary winding 15 and ground through the anode-cathode of SCR Q1. The triggering current resistor R1 is connected directly between the anode and the gate of SCR Q1, the transistor Q2 of FIG. 1 being omitted. An NPN transistor Q4 is connected across the gate-cathode circuit of SCR Q1, the base electrode of this transistor being connected, through a current limiting resistor R7, to a junction 24 in a voltage divider 25. Divider 25 includes the PTC thermistor TH2, a reference level resistor R9 and a response differential resistor R8. Relay contacts RY1A are again connected for energizing a load when relay winding RY1 is energized but the response differential resistor (R8) is shunted by the normally closed side of contacts RY1B rather than the normally open side as in FIG. 1.

The collector of a second NPN transistor Q5 is also connected to the gate terminal of SCR Q1 and the emitter of transistor Q5 is connected, through a diode D5, to the junction 24. The base terminal of transistor Q5 is connected to a junction 31 in a second voltage divider 33 connected across leads L4 and L5. Divider 33 comprises a pair of resistors R10 and R11 so that the voltage provided at junction 31 is a preselected portion of the voltage bearing across leads L4 and L5. The values of resistors R10 and R11 are selected so that the voltage at junction 31 is normally lower or more negative than that at junction 21 when the resistance of thermistor TH2 is within its normal range. Thus transistor Q5 is normally reverse-biased and nonconducting during normal operation of this control circuit.

During normal operation of the FIG. 3 controller, relatively low temperatures at thermistor TH2 will cause a negative voltage to be developed at junction 24 since thermistor TH2 is of the positive temperature coefficient type. A negative voltage at junction 24 reverse-biases transistor Q4 since its emitter is connected to ground. Thus triggering current flowing through resistor R1 is free to produce conduction in SCR Q1 which, in turn, energizes relay coil RY1. Energization of coil RY1 closes contacts RY1A so that the load circuit may be energized.

Figure 4:
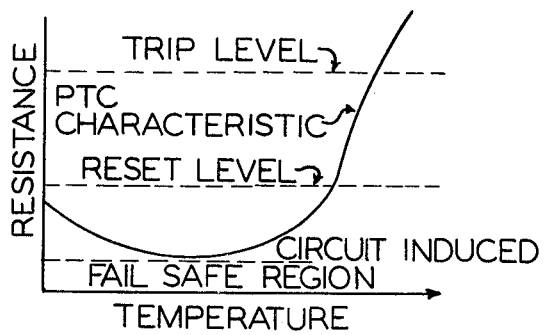
FIG. 4 is a graph representing the variations in resistance of the PTC thermistor with temperature and illustrating the response of the circuit of FIG. 3 to such variations.

When thermistor TH2 is exposed to relatively higher temperatures the voltage at junction 24 rises and transistor Q4 becomes forward biased. Triggering current is thus shunted away from the gate electrode of SCR Q1 which in turn deenergizes relay coil RY1 causing the load circuit to also be deenergized. It can thus be seen that the mode of operation of the FIG. 3 controller is appropriate for providing motor protection using PTC type thermistors. The alternate shunting of resistor R8 by contacts RY1B provides a desirable differential in the response of the controller in known manner to provide separate trip and reset levels as illustrated in FIG. 4.

If the voltage at junction 24 exceeds its normal range in the positive sense the load circuit will be deenergized according to the normal mode of operation explained previously. If, however, the voltage at junction 24 goes outside of its normal range in the negative sense, as may be caused by a short in thermistor TH2 or in the leads connected thereto, the normal control mode of operation will not deenergize the load through transistor Q4. Fail-safe operation under such conditions is, however, provided through the operation of transistor Q5. If an abnormally low value of resistance in the thermistor circuit causes the voltage at junction 24 to drop below the voltage provided at junction 31, the transistor Q5 becomes forward biased and conduction in its emitter-collector circuit shunts triggering current away from the gate electrode of SCR Q1, thereby deenergizing the load independently of the operation of transistor Q4. This mode of operation is indicated by the area designated Circuit Induced Fail Safe Region in FIG. 4.

In the modification illustrated in FIG. 5, PTC thermistor TH2 again controls the triggering of SCR Q1 through transistor Q4 as in the embodiment of FIG. 3. The transistor Q5 of the FIG. 3 embodiment is, however, omitted. Fail-safe operation for abnormally low thermistor resistances is obtained instead by means of a connection of the gate electrode of SCR Q1 through a resistor R12 and a diode D6 to the junction 24. The value of resistor R12 is chosen so that when the voltage at junction 24 becomes sufficiently negative with respect to ground, a sufficient portion of the current flowing through resistor R1 is diverted away from the gate electrode of SCR Q1 to prevent the SCR from triggering even though the transistor Q4 is not conducting at that time.

Figure 5:
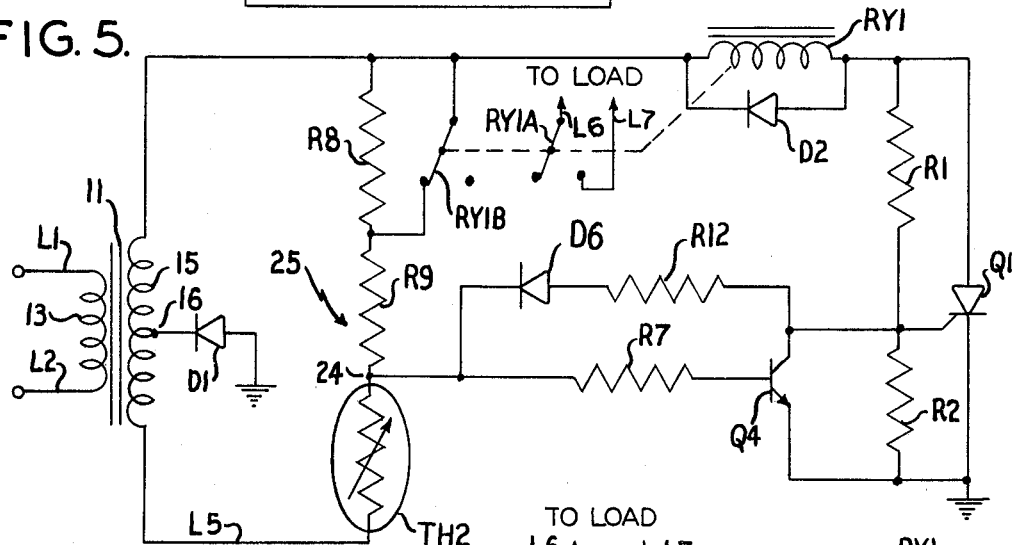
FIG. 5 is a schematic circuit diagram of a modification also employing a PTC thermistor.
Figure 6:
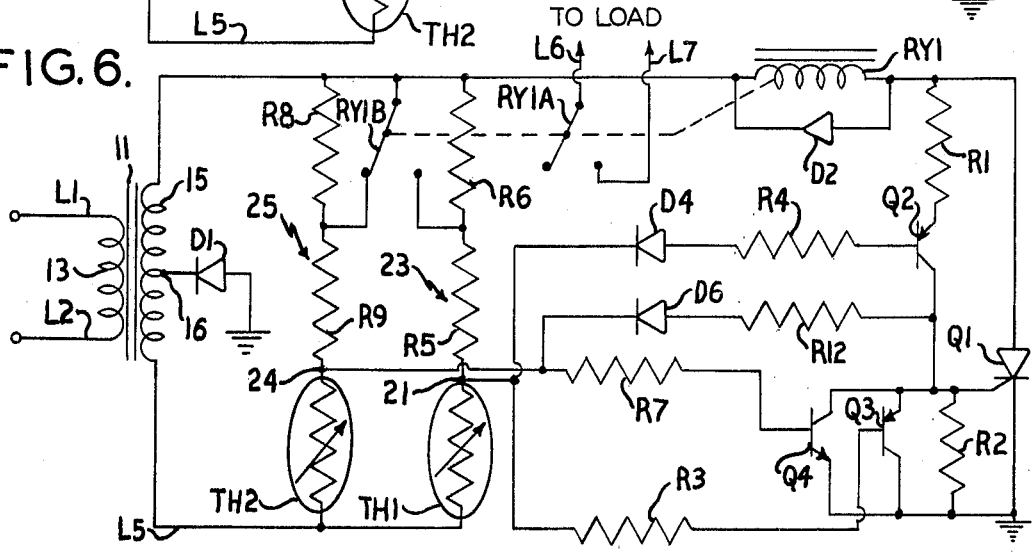
FIG. 6 is a schematic circuit diagram of a multiple input fail-safe controller of this invention employing both an NTC thermistor and a PTC thermistor.

In FIG. 6 there is illustrated a multiple input controller of the type described in greater detail in my copending application Ser. No. 430,006, now Patent No. 3,329,869, filed Feb. 3, 1965. This controller includes two sensing voltage dividers each of which includes a respective thermistor. The voltage dividers may for example be constituted by the dividers 23 and 25 described previously with reference to FIGS. 1 and 5. The control voltage providing junction in each of these dividers is connected to the base terminal of the respective control transistor Q3 and Q4 as in the earlier embodiments and the emitter-collector circuits of these transistors are connected in parallel across the gate-cathode circuit of SCR Q1. Because they are of complementary conductivity types, the transistors Q3 and Q4 are connected emitter-to-collector and vice versa.

As is described in greater detail in said copending application, each of the voltage dividers 23 and 25, operating through its respective transistor Q3 or Q4, has the power to cut-off or discontinue the flow of triggering current to SCR Q1. Thus, for example, thermal-protection for an electric motor may be provided in which the temperature of the motor windings is sensed at several points. If the temperature at any one of these points exceeds a predetermined level, the motor is deenergized. Each of the dividers 23 and 25 is also provided with the respective fail-safe circuitry, as illustrated in FIGS. 1 and 5, so that if the control voltage provided by either divider goes outside of its normal range in the direction which would normally permit energization of the load, the flow of triggering current is discontinued independently of the operation of the transistor (Q3 or Q4) which provides normal control operation. In particular, if the NTC thermistor TH1 appears to have an abnormally high resistance and the voltage at junction 21 becomes abnormally positive, forward bias is withdrawn from the transistor Q2 so the triggering current to the SCR Q1 is discontinued independently of the operation of the respective control transistor Q3. Similarly, if the PTC thermistor TH2 becomes short-circuited or otherwise exhibits an abnormally low resistance causing an abnormally negative voltage to appear at junction 24, the triggering current flowing through resistor R1 is diverted through resistor R12 and diode D6 away from the gate electrode of SCR Q1 so that the load is deenergized. In other words, the FIG. 6 controller is essentially a combination of the features of the controllers of FIGS. 1 and 5 and thus provides multiple input sensing capability employing both an NTC and a PTC thermistor, while retaining a fail-safe mode of operation for each of these inputs.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:
1. A fail-safe controller for selectively energizing a load in response to variations in the resistance of a sensor within a given range, said controller comprising:
   semiconductor current switching means for switching the flow of power to said load, said semiconductor current switching means having a control electrode to which triggering current is applied;
   switch means coupled to said semiconductor current switching means for effecting energization of the load in response to triggering of said semiconductor current switching means;
   circuit means including said sensor and defining a voltage divider for generating a control voltage which varies as a function of the resistance of said sensor, there being a normal range of control voltages corresponding to the normal control range variations in the resistance of said sensor, said sensor comprising an operative portion of said voltage divider;

means including a transistor connected to said divider and responsive to said voltage for selectively applying triggering current to said control electrode, said transistor being operative to discontinue the flow of triggering current to said control electrode when said control voltage is of a first polarity with respect to a preselected threshold within said normal range of control voltages;

and means responsive to control voltages which are of polarity opposite to said first polarity with respect to said threshold and which are outside of said normal range of control voltages for discontinuing the flow of triggering current to said control electrode independently of the operation of said transistor whereby circuit failures in said controller which produce control voltages outside of said normal range of control voltages cause said load to be de-energized.

2. A controller as set forth in claim 1 wherein said semiconductor current switching means includes an SCR and the emitter-collector circuit of said transistor shunts the gate-cathode circuit of said SCR.

3. A controller as set forth in claim 2 in which said means for discontinuing the flow of triggering current in response to control voltages outside of said normal range includes a second transistor connected in series with the means providing triggering current to said SCR.

4. A controller as set forth in claim 2 in which said means for discontinuing the flow of triggering current in response to control voltages outside of said normal ranges includes a second voltage divider providing a reference voltage which is outside of said normal range, the last said means further including a second transistor having a base-emitter circuit which is connected between the two said voltage dividers for responding to the relative voltage levels provided thereby, the collector of said second transistor being connected to the gate terminal of said SCR for shunting triggering current from said SCR when said control voltage passes outside of said normal range.

5. A controller as set forth in claim 2 in which said means for discontinuing the flow of triggering current in response to control voltages outside of said normal ranges includes a circuit including a current limiting resistor connecting the gate terminal of said SCR to said voltage divider for shunting triggering current from said SCR when said control voltage passes outside of said normal range.

6. A fail-safe controller for selectively energizing a load in response to variations in the resistance of a sensor within a given range, said controller comprising:

an SCR for switching the flow of power to said load, said SCR having a gate electrode to which triggering current is applied to cause energization of the load;

circuit means including said sensor and defining a voltage divider for generating a control voltage which varies as a function of the resistance of said sensor, there being a normal range of control voltages corresponding to the normal control range variations in the resistance of said sensor, said sensor comprising an operative portion of said voltage divider;

means including a current limiting impedance and a first PNP transistor in series therewith for applying triggering current to said gate electrode from the anode circuit of said SCR, the base terminal of said first PNP transistor being supplied with said control voltage for discontinuing the flow of triggering current to said control electrode in response to positive control voltages which are outside of said normal range of control voltages so as to de-energize said load; and a second PNP transistor the emitter of which is connected to the gate electrode of said SCR, the collector of which is connected to the cathode of said SCR and the base of which is supplied with said control voltage, said transistor being operative to shunt the flow of triggering current away from said gate electrode when said control voltage is negative with respect to a preselected threshold within said normal range of control voltages thereby to de-energize said load.

7. A fail-safe controller for selectively energizing a load in response to variations in the resistance of a sensor within a given range, said controller comprising:

an SCR for switching the flow of power to said load, said SCR having a gate electrode to which triggering current is applied to cause energization of the load;

means including a current limiting impedance for applying triggering current to said gate electrode from the anode circuit of said SCR;

circuit means including said sensor and defining a voltage divider for generating a control voltage which varies as a function of the resistance of said sensor, there being a normal range of control voltages corresponding to the normal control range variations in the resistance of said sensor;

an NPN transistor the emitter of which is connected to the cathode of said SCR, the collector of which is connected to the gate electrode of said SCR and the base of which is supplied with said control voltage, said transistor being operative to shunt the flow of triggering current away from said gate electrode when said control voltage is positive with respect to a preselected threshold within said normal range of control voltages thereby to de-energize said load;

means for providing a predetermined reference voltage; and a second transistor the input circuit of which is responsive to the difference between said control voltage and said reference voltage and the collector of which is connected to the gate electrode of said SCR for shunting said flow of triggering current away from said gate electrode in response to negative control voltages which are outside of said normal range of control voltages so as to de-energize said load.

8. A fail-safe controller for selectively energizing a load in response to variations in the resistance of a sensor within a given range, said controller comprising:

an SCR for switching the flow of power to said load, said SCR having a gate electrode to which triggering current is applied to cause energization of the load;

means including a current limiting impedance for applying triggering current to said gate electrode from the anode circuit of said SCR;

circuit means including said sensor and defining a voltage divider for generating at a junction in said divider a control voltage which varies as a function of the resistance of said sensor, said sensor being serially connected to said junction, there being a normal range of control voltages corresponding to the normal control range variations in the resistance of said sensor;

an NPN transistor the emitter of which is connected to the cathode of said SCR, the collector of which is connected to the gate electrode of said SCR and the base of which is supplied with said control voltage, said transistor being operative to shunt the flow of triggering current away from said gate electrode when said control voltage is positive with respect to a preselected threshold within said normal range of control voltages thereby to de-energize said load; and means including a current limiting resistor for connecting the gate electrode of said SCR to said junction for shunting said flow of triggering current away from said gate electrode in response to negative control voltages which are outside of said normal range of control voltages so as to de-energize said load.

9. A controller as set forth in claim 1 wherein said voltage divider comprises at least one resistance element serially connected with said sensor to define a junction at which said control voltage is generated.

References Cited

UNITED STATES PATENTS

| | | |
|---|---|---|
| 3,136,877 | 6/1964 | Heller. |
| 3,182,201 | 5/1965 | Sklar. |
| 3,195,033 | 7/1965 | Jones _____ 317—13 XR |
| 3,196,286 | 7/1965 | Darack _____ 328—3 XR |
| 3,310,714 | 3/1967 | Gargani _____ 317—148.5 |
| 3,328,606 | 6/1967 | Pinkaers _____ 307—252 |
| 3,343,036 | 9/1967 | Steen _____ 317—31 |
| 3,379,939 | 4/1968 | Obenhaus _____ 317—13 XR |

JOHN S. HEYMAN, Primary Examiner

STANLEY T. KRAWCZEWICZ, Assistant Examiner

U.S. Cl. X.R.

307—92, 305, 252; 317—13, 31, 41, 132, 148.5